(12) United States Patent
Nathaniel et al.

(10) Patent No.: US 11,418,399 B2
(45) Date of Patent: Aug. 16, 2022

(54) MULTI-FABRIC DEPLOYMENT AND MANAGEMENT PLATFORM

(71) Applicant: Cisco Technology, Inc., San Jose, CA (US)

(72) Inventors: Uffaz Nathaniel, Northampton, PA (US); Aakruthi Ramkumar Gopisetty, Mountain View, CA (US); Jason David Notari, Pleasanton, CA (US); Shyam Kapadia, San Jose, CA (US); Lukas Krattiger, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/399,043

(22) Filed: Apr. 30, 2019

(65) Prior Publication Data

US 2020/0351164 A1 Nov. 5, 2020

(51) Int. Cl.
| | |
|---|---|
| *H04L 41/08* | (2022.01) |
| *H04L 12/46* | (2006.01) |
| *H04L 41/0806* | (2022.01) |
| *H04L 41/0893* | (2022.01) |
| *H04L 41/12* | (2022.01) |
| *H04L 45/74* | (2022.01) |

(52) U.S. Cl.
CPC ...... *H04L 41/0883* (2013.01); *H04L 12/4641* (2013.01); *H04L 41/0806* (2013.01);
(Continued)

(58) Field of Classification Search
CPC ... H04L 5/0055; H04L 5/0007; H04L 1/1812; H04L 67/10; H04L 67/12; H04L 1/0003;
(Continued)

(56) References Cited

U.S. PATENT DOCUMENTS

| | | |
|---|---|---|
| 7,328,260 B1 | 2/2008 | Muthiyan et al. |
| 7,484,021 B2 | 1/2009 | Rastogi et al. |

(Continued)

FOREIGN PATENT DOCUMENTS

| | | |
|---|---|---|
| EP | 3205055 | 5/2020 |

OTHER PUBLICATIONS

International Search Report and Written Opinion from the International Searching Authority, dated Jun. 22, 2020, 12 pages, for corresponding International Patent Application No. PCT/US2020/030134.

*Primary Examiner* — Jonathan A Bui
*Assistant Examiner* — Zonghua Du
(74) *Attorney, Agent, or Firm* — Polsinelli PC

(57) ABSTRACT

The present technology provides a framework for user-guided end-to-end automation of network deployment and management, that enables a user to guide the automation process for any kind of network deployment from the ground up, as well as offering network management, visibility, and compliance verification. The disclosed technology accomplishes this by creating a stateful and interactive virtual representation of a fabric using a customizable underlay fabric template instantiated with user-provided parameter values and network topology data computed from one or more connected network devices. A set of expected configurations corresponding to the user-specified underlay and overly fabric policies is then generated for deployment onto the connected network devices. Network deviations from the intended fabric policies are addressed by the provision of one or more configuration lines to be deployed onto or removed from the connected network devices to bring the network state in agreement with the set of expected configuration.

20 Claims, 5 Drawing Sheets

(52) U.S. Cl.
CPC .......... *H04L 41/0893* (2013.01); *H04L 41/12* (2013.01); *H04L 45/74* (2013.01)

(58) Field of Classification Search
CPC ............. H04L 41/0883; H04L 12/4641; H04L 41/0806; H04L 41/0893; H04L 41/12; H04L 45/74; H04M 1/7253; H04W 74/0833; H04W 76/15; H04W 24/10; H04W 72/042; H04W 76/14; H04W 84/18; H04W 88/06
See application file for complete search history.

(56) References Cited

U.S. PATENT DOCUMENTS

| | | | |
|---|---|---|---|
| 7,725,921 B2* | 5/2010 | Trutner | H04L 63/0227 726/1 |
| 7,934,018 B1 | 4/2011 | Lavallee et al. | |
| 8,352,866 B2 | 1/2013 | Bethune et al. | |
| 9,286,047 B1* | 3/2016 | Avramov | G06F 8/61 |
| 9,503,523 B2* | 11/2016 | Rosset | H04L 67/1097 |
| 10,152,357 B1* | 12/2018 | Espy | G06F 9/5005 |
| 2015/0003282 A1* | 1/2015 | Gourlay | H04L 49/65 370/254 |
| 2015/0207693 A1* | 7/2015 | Xie | H04L 41/22 709/221 |
| 2016/0112252 A1* | 4/2016 | Notari | H04L 67/10 709/221 |
| 2017/0289002 A1* | 10/2017 | Ganguli | H04L 12/4641 |
| 2018/0295036 A1* | 10/2018 | Krishnamurthy | G06F 9/45558 |
| 2018/0367390 A1 | 12/2018 | Ponnuswamy et al. | |
| 2018/0367416 A1 | 12/2018 | Nagarajan et al. | |
| 2020/0059420 A1* | 2/2020 | Abraham | G06F 9/5072 |
| 2021/0067408 A1* | 3/2021 | Vaidya | G06F 8/60 |
| 2021/0385159 A1* | 12/2021 | Mehmedagic | H04L 63/0218 |

* cited by examiner

200

202
```
22
23  vrf context management
24  ip route 0.0.0.0/0 172.22.31.1
25  interface Ethernet 1/1
26    no switchport
27    ip address 10.4.0.9/30
28    description connected-to-mini-leaf1-Ethernet1/50
29    mtu 9216
30    ip router ospf UNDERLAY area 0.0.0.0
31    ip ospf network point-to-point
32    ip pim sparse-mode
33    no shutdown
34  interface ethernet1/2
35    shutdown
36    switchport
37    switchport mode trunk
38    switchport trunk allowed vlan none
39    mtu 9216
40    spanning-tree port type edge trunk
41    shutdown
```
206

204
```
vlan 1
vrf context management
ip route 0.0.0.0/0 172.22.31.1
interface Ethernet 1/1 no shutdown
interface ethernet1/2
```
208

Fig. 2

MULTI-FABRIC DEPLOYMENT AND MANAGEMENT PLATFORM

TECHNICAL FIELD

The present technology pertains to systems and methods for management of network devices. More specifically it is directed to deployment and management of Software-Defined Intent-based networks.

BACKGROUND

Traditional network deployment and management systems are generally specific to a particular fabric type and primarily directed to fabric management fabric after an initial deployment is complete. A functionality for providing effective start-up deployment is typically absent in such network deployment and management systems. Consequently, There is no general framework for facilitating management of a complete end-to-end (overlay and underlay) fabric deployment. Moreover, the automation process in conventional network management systems may sometime be transparent to the user and do not offer users the ability to validate configurations and/or guide the automated configuration deployment process. Furthermore, conventional network management systems do not support out of band configuration changes performed outside the built-in configuration deployment model while still maintaining configuration consistency throughout the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 2 illustrates an example configuration compliance process to ensure that the state of a connected network state is continuously kept in synch with the virtual fabric state representation, in accordance with some embodiments of the present technology.

DESCRIPTION OF EXAMPLE EMBODIMENTS

Figure 1:
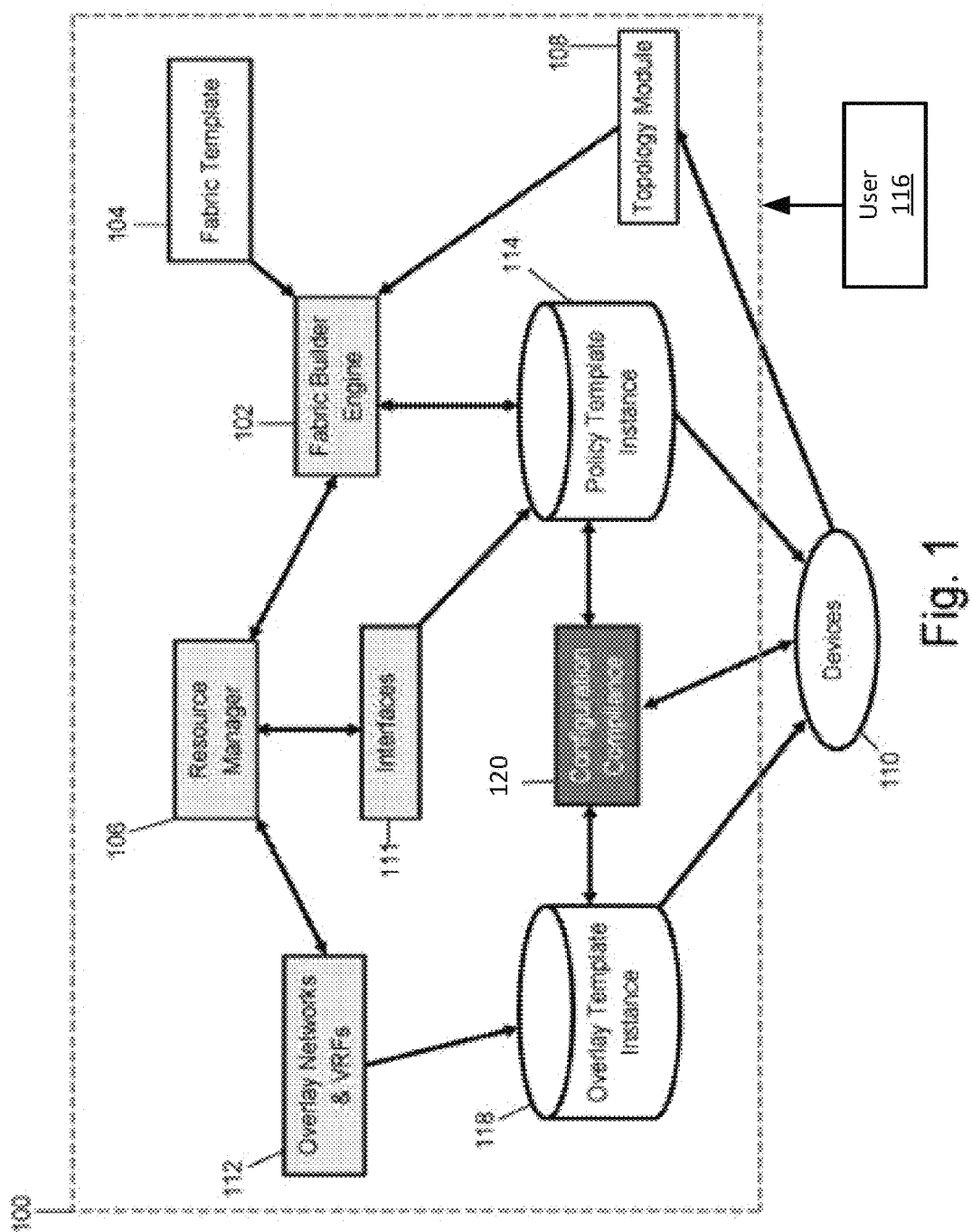
FIG. 1 illustrates a block diagram representing various operational components and interaction there between for an example fabric deployment and management system, in accordance with some embodiments of the present technology.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

OVERVIEW

Disclosed are systems and methods directed to an end-to-end open-standard fabric deployment and management technology with user-controlled automation functionality and accelerated underlay and overly fabric deployment features using pre-configured best practice policies. The disclosed technology offers a complete end-to-end extensible solution for the deployment and management of any fabric type.

In some aspects of the present technology, a method includes: creating a virtual stateful fabric representation from a user-instantiated underlay fabric template, one or more user-specified overlay fabric policies and a network topology information computed from one or more devices imported onto the fabric; generating a set of expected configurations corresponding to the virtual stateful fabric representation for deployment onto the one or more devices; and deploying, onto the one or more device, one or more pending configuration lines to bring a state of the one or more devices in sync with the set of expected configurations.

In some aspects of the present technology, a system includes one or more processors and at least one computer-readable storage medium with stored instructions, which when executed by the one or more processors cause the one or more processors to: create a virtual stateful fabric representation from a user-instantiated underlay fabric template, one or more user-specified overlay fabric policies and a network topology information computed from one or more devices imported onto the fabric; generate a set of expected configurations corresponding to the virtual stateful fabric representation for deployment onto the one or more devices; and deploy, onto the one or more device, one or more pending configuration lines to bring a state of the one or more devices in sync with the set of expected configurations.

DETAILED DESCRIPTION

Building network architectures has always been a challenge. Rapidly increasing network size and complexity, in combination with more astringent service quality requirements and performance expectations has pushed network service providers and vendors to accommodate networks offering a multitude of service policy requirements while streamlining the deployment and management of the same. This has also led to a need for an increasingly versatile and comprehensive automation platform for deployment and management of data networks.

The implementation of a fully managed and controlled environment for large and complex networks may require migration to a completely different paradigm which may be impractical and costly to implement. Furthermore, accommodating the widening range and increasing complexity of network services offered has led to multiple variants of customized overlay fabrics with specific control and data forwarding characteristics based on different service policy requirements. Accordingly, in keeping with the current network technology trends, network management systems are pushed towards ever more flexible and versatile automation platforms to ensure operability with a variety of fabric topologies and networking technologies. Another feature of relevance to network clients/users is the ability for network deployment and management platform to support seamless integration of direct user interventions during the automation process while dynamically maintaining accurate topology awareness and preserving operational and functional consistency across the network. Accordingly, some embodiments of the present technology are directed to an automated network deployment and management system capable of building a network deployment from the ground up while simultaneously offering management, visibility, compliance/auditing, and verification control.

A Fabric Builder system, as disclosed in accordance with some embodiments of the present technology, enables high-level intention of a fabric (i.e., fabric type) to be defined and deployed in an accelerated fashion in response to, for example, a received user selection, directed to selecting a configuration template for a particular fabric type (i.e., a pre-configured fabric template) from a pre-configured menu of one or more pre-configured fabric templates.

Fabric templates comprise rules that define the high-level intentions of a fabric (i.e., rules governing which configuration portions are to be joined together and the order in which various configurations should be applied such that dependencies are satisfied and appropriate resources are symmetrically allocated and tracked). For example, a fabric template may define a fabric based on Virtual Extensible LAN with Ethernet VPN (VXLAN EVPN) or one based on traditional Core/Access architecture. In some embodiments of the present technology, a Fabric Builder system may come prepackaged with several intentions (i.e., fabric templates) which may be selected, by a user, from a Fabric Builder menu. The end-user may have customization control over a selected fabric profile through a Policy Editor. Responsive to a user selection of an appropriate fabric template, the Fabric Builder may then create the fabric underlay.

The fabric template may have one or more lifecycle methods for managing each step of fabric deployment. The life cycles methods are known by the Fabric Builder and may be invoked, by the Fabric Builder, during the deployment process. For example, the Fabric Builder may call an init( ) method to initialize the various resource pools specified for a selected fabric template including any state associated in the fabric settings. Accordingly, The Fabric Builder, as described in accordance with some embodiments of the present technology, enables deployment and management of multiple fabric types, each with its own policy configurations and resource pool. Once the Fabric Builder, in response to one or more user inputs, invokes and instantiated a fabric template a next step may be to import connected network devices onto the fabric.

Once network devices are interconnected with the Fabric Builder system, the Fabric Builder may identify and import the network devices connected to it using, for example, a Discovery Graphical User Interface (GUI) which may require discovery credentials such as username and/or password from a user. Alternatively, responsive to a user input, the Fabric Builder may import the connected network devices onto the fabric using a user-activated Power ON Auto Provisioning (POAP) function by assigning user-provided static management IPs to the connected network devices (switches). Once Link layer connectivity is established, for example following a user-initiated bootstrap operation, the Fabric Builder may invoke the associated fabric template to handle validation of the network devices. For example, a preAddSwitch( ) method may be called that performs pre-checks and other device-type validation checks against the specified fabric settings (i.e., as provided in the user-editable fabric template (104). Subsequently the Fabric Builder may call a discovery( ) method to fetch various pieces of information from a given device using, for example, a combination of system monitoring protocols (i.e., SNMP/SSH/DME) and other southbound interfaces (i.e., OpenFlow protocol specifications that enable communication between controllers and network nodes). If the discovery operation succeeds, a postAddSwitch( ) method may be called to add the switches into the fabrics as well as clean up switch configurations (i.e., in case of greenfield deployments). The Fabric Builder may examine existing configuration if any exist on any of the connected network devices to learn as much as it can about the topology of the network. The Fabric Builder may, furthermore, collect topology-related information from, for example, the connectivity states of one or more network device and integrates the information to compute a representation of the network topology.

Subsequently, based on the selected Fabric template instantiated with one or more user-provided values, and the computed topology data, the Fabric Builder generates a stateful virtual representation of the fabric that a user may interact with, for example, through a Graphical User Interface (GUI) or templates. In accordance with some embodiments of the present technology, the generated internal stateful fabric representation is continuously kept up to date with any out of band network changes (i.e., network changes that occur by means other than Fabric Builder interface) or violations of the user specified fabric policy. Furthermore, the stateful fabric representation, generated internally by the Fabric Builder system, has traversable properties whereby actions on the state may be validated and either accepted or rejected.

Any network state deviation from the internal fabric state maintained by the Fabric Builder may be detected, for example, through Data Management Engine (DME) notifications, Simple Network Management Protocol (SNMP) changes and/or Command Line Interface (CLI). When a deviation is detected the Fabric Builder provides a network operator with a visual or text-based description of the deviated network state as well as the steps that may be required to reconcile the difference. Responsive to a user selection, the Fabric Builder may then generate and push the necessary configuration lines onto the network devices to bring the network state into agreement with the virtually represented fabric state (i.e., user-customized fabric intentions expressed on the virtual fabric representation may be converted to corresponding configuration lines and deployed onto the associated network devices).

Any incremental changes to the fabric in terms of addition of new devices, network node replacement, addition/removal of links, addition/removal/edit of host interface policies, or any other user-initiated overlay/underlay customizations are all handled via the Fabric Builder. The Fabric Builder system, as described in some embodiments of the present technology, builds a general framework that allows it to manage any type of fabric through a virtual stateful representation of the fabric which the user interacts with.

FIG. 1 provides a block diagram illustrating the interactions among various components of an example Fabric Builder 100 to facilitate the realization of a fabric, in accordance with some embodiments of the present technology. The example Fabric Builder 100 comprises a Fabric Builder Engine 102 which takes in as input high-level intentions of an (underlay) fabric as defined via a user-selected Fabric Template 104. The Fabric Builder System 100 further comprises a Resource Manager 106 for storing and tracking user-provided fabric parameter values (i.e., one or more pre-defined IP addresses or IP address range(s), Autonomous System Number, Underlay routing protocol, one or more Virtual LAN (VLAN) identifiers or VLAN identifier range(s), and one or more Virtual Port Channel Identifiers) on a per fabric, per device and/or per link basis. For example, the Resource Manager 106 may retrieve and store interface address and identifier information associated with the connected device topology 110 as represented by the functional block 111 in FIG. 1. Similarly, the Resource Manager 106 may retrieve and store overlay fabric related address and identifier parameters for user-specified overlay structures (i.e., Virtual LAN instances, Virtual Routing and Forwarding domains, and Virtual Port Channel pairing) as represented by 112 in FIG. 1. The Fabric Builder Engine 102 may then interact with Resource Manager 106 to fetch the data it may need for building the internal virtual stateful representation of the fabric.

The Fabric Builder System 100 may further comprise a Topology Module 108 for collecting topology data from a connectivity state of two or network devices 110 using, for example, a network discovery protocol such as Cisco discovery protocol (CDP) or Link Layer discovery protocol (LLDP). The Topology module 108 may then integrate the information to generate a representation of network topology, which it may then provide to the Fabric Builder Engine 102 so that an in-memory stateful representation of the topology may be created.

Ultimately, the Fabric Builder Engine 102 may incorporate resource information obtained from the Resource Manager 106 with fabric intentions provided by the Fabric Template 104 and the topology data from the Topology Module 108 to generate one or more Policy Template Instances (PTIs), indicated by reference 114 in FIG. 1. Policy Template Instances comprise expected configuration statements that are validated and consistent with the fabric intentions and best practices. The Fabric Builder 100, may also take the overlay fabric intentions expressed by a user 116 (i.e., virtual components and functionalities like VPC pairing set up by a user) and generate a set of Overlay Template instances 118 that comprise expected configuration statements consistent with one or more user-specified fabric policies or policy changes.

The Fabric Builder 100 may further include a Closed-Loop Configuration Compliance Module 120 to ensure reliable fabric deployments and provide confirmation that the user specified and/or selected fabric policies are actually deployed onto the associated network devices 110. Moreover, the Configuration Compliance module may address one or more discrepancies between the virtual stateful fabric representation (i.e., characterized by the expected fabric configuration generated by the Fabric Builder Engine) and the state of the one or more network devices (i.e., characterized by a running configuration of the one or more network devices) by performing a difference operation between the expected fabric configuration expressed by one or more Policy Template Instances 114 and a running configuration on the network devices 110. Based on the difference output, the Configuration Compliance module 120 may generate a set of pending configuration statements to be pushed onto (or removed from) the connected network devices 110 to resolve any configuration mismatch which may exist with the expected fabric configuration.

Similarly, the Configuration Compliance module 120 may also take in the overlay policy intentions expressed by a user (i.e., virtual components and functionalities set up by a user) and generates the corresponding lines of configurations to be deployed onto the associated devices in order to bring them into synchronization with the user-specified fabric overlay policies (i.e., expected fabric overly configuration). In order to accomplish this, the Compliance Configuration module may perform a difference operation between the intended fabric configuration and the running device configuration existing on the connected network devices. The difference (i.e., missing configuration lines needed to match a device running configuration with specified fabric intentions) may then be presented to the user and, responsive to the user input, pushed onto one or more connected network devices 110 to bring the connected network devices in synch with the expected fabric configurations.

FIG. 2 illustrate a sample difference 200 generated from the intentions defined in fabric template and current running configuration on one or more connected network devices. The difference between an expected fabric configuration 202, representing one or more user-customizable fabric intentions, and the running configuration 204, existing on a network device, is provided by configuration blocks 206 and 208. Accordingly, configuration blocks 206 and 208 in the expected fabric configuration 202 correspond to configurations that are pending. Pending configurations (i.e., blocks 206, 208) may be pushed onto the respective network devices in response to one or more user inputs, to thereby bring the configured state of the connected network devices into alignment with the specified fabric policies and intentions.

In accordance with some embodiments of the present technology, the Configuration Compliance module may constantly monitor the fabric to ensure fabric consistency. For example, the Fabric Builder system continuously keeps the state of the fabric up-to-date with any intentional and/or unanticipated or uncontrolled changes that may be made to the network (i.e., any out-of-band changes or violations that may occur). The Fabric Builder system may then provide the end-user with a difference between the unmanaged state of the network and what steps are needed to reconcile the difference. The system allows a user to decide when and how to remediate the issues. Remediation is straightforward and simple and involves a deployment of the synchronization corrections to restore the fabric to its intended configuration.

Figure 3:
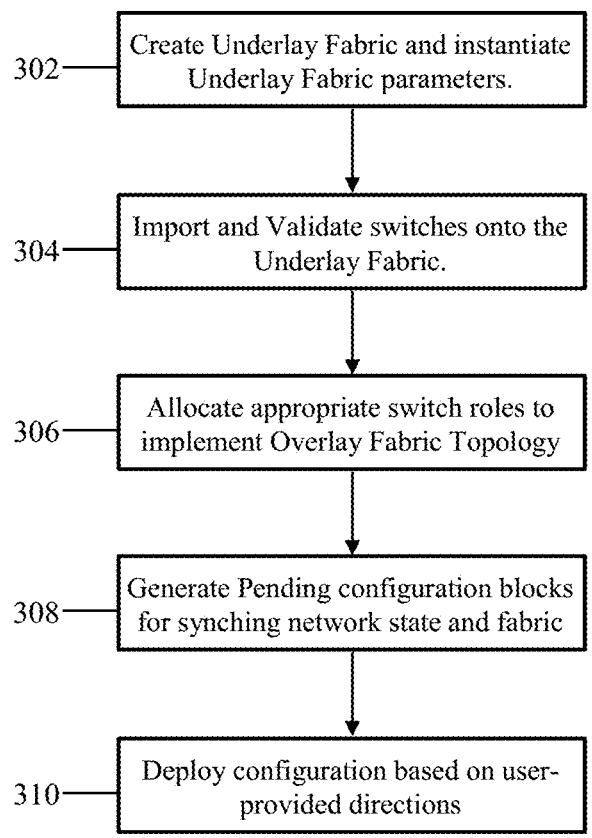
FIG. 3 illustrates an example flow chart for a ground-up end-to-end fabric deployment and management process, in accordance with some embodiments of the present technology.

Flow chart 300, provided in FIG. 3, illustrates an example operational workflow for a Fabric Builder System, in accordance with some embodiments of the present technology. With reference to flow chart 300, at step 302 the Fabric Builder system creates a new fabric in response to, for example, a user selection of an appropriate Fabric template from a pre-configures Fabric template menu. The Fabric Builder Engine may then invoke a lifecycle method defined in the Fabric template to initializes the various resource pools (associated with the selected fabric template) with one or more user-provided inputs. At step 304, the Fabric Builder may initiate a discovery of the corresponding switches, using, for example, a switch discovery process or POAP based static assignment of management IPs, and subsequently import the switches onto the underlay fabric. During this step (304), the Fabric Builder may also gather network topology data from a connectivity state of one or more switches.

In some embodiments, a user-activated Bootstrap function may be utilized, in response to a user input, to bring the switches into existence on the newly created underlay fabric. Once the switches are imported onto the fabric at step 304, the Fabric Builder System, at step 306, may associate user-specified roles and functions to one or more switches (i.e., set up Virtual Port Channel switch pairs) to define one or more overlay fabric policies. The Fabric Builder Engine may combine the underlay fabric policies and user inputs from step 302 and the topology data acquired at step 304, with the user-specified overlay fabric policies from step 306 to generate an interactive stateful representation of the fabric which it may use internally.

At step 308, the Fabric Builder may convert the combination of default and user-provided underlay and overlay fabric policies into corresponding lines of pending configuration that may be deployed onto the one or more switches to synchronize the network state (i.e., characterized by the running configurations present on the switches) with the Fabric Builder's stateful representation of the fabric (Characterized by one or more user-specified fabric intentions). At step 310, the Fabric Builder may deploy one or more generated pending configurations, in accordance with user-provided directions, onto one or more switches to thereby synchronize the network state with the user-intended fabric state.

Figure 4:
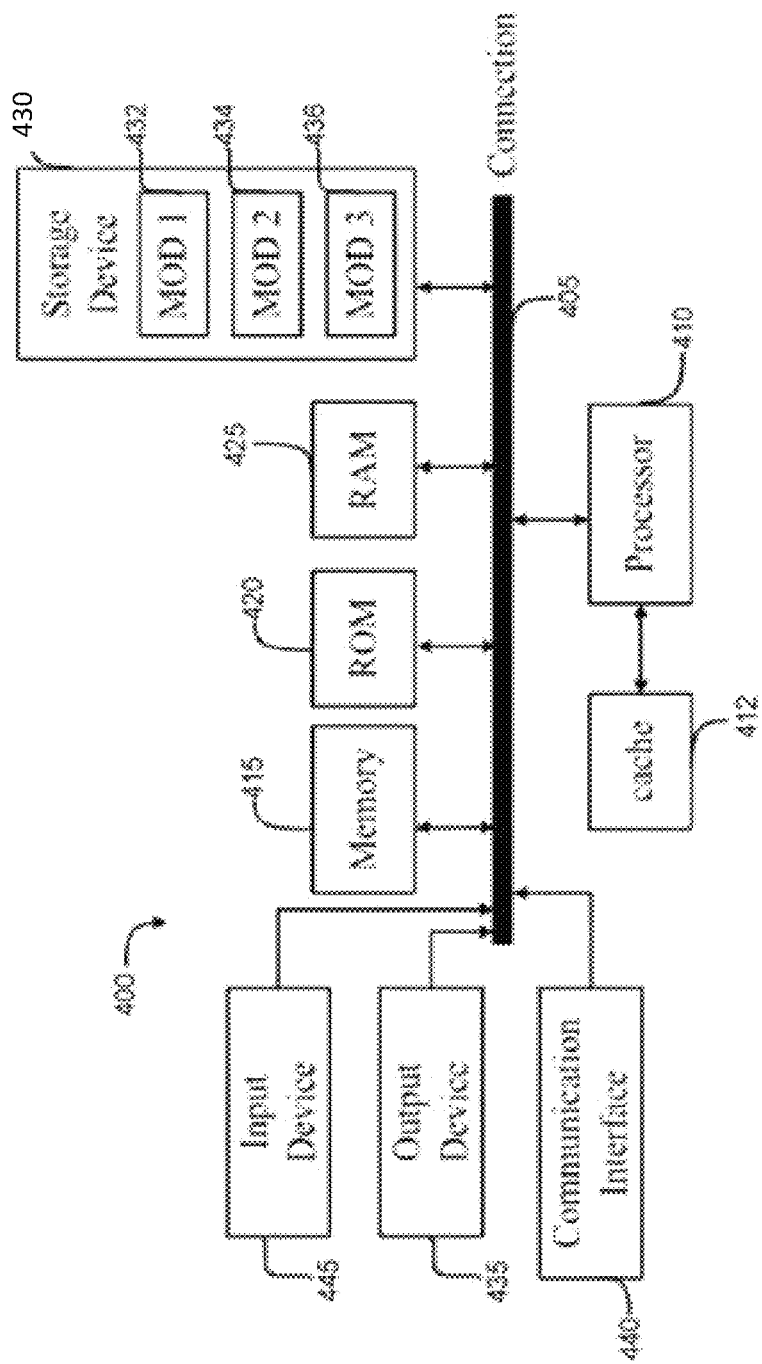
FIG. 4 illustrates an example network device, in accordance with some embodiments of the present technology.
Figure 5:
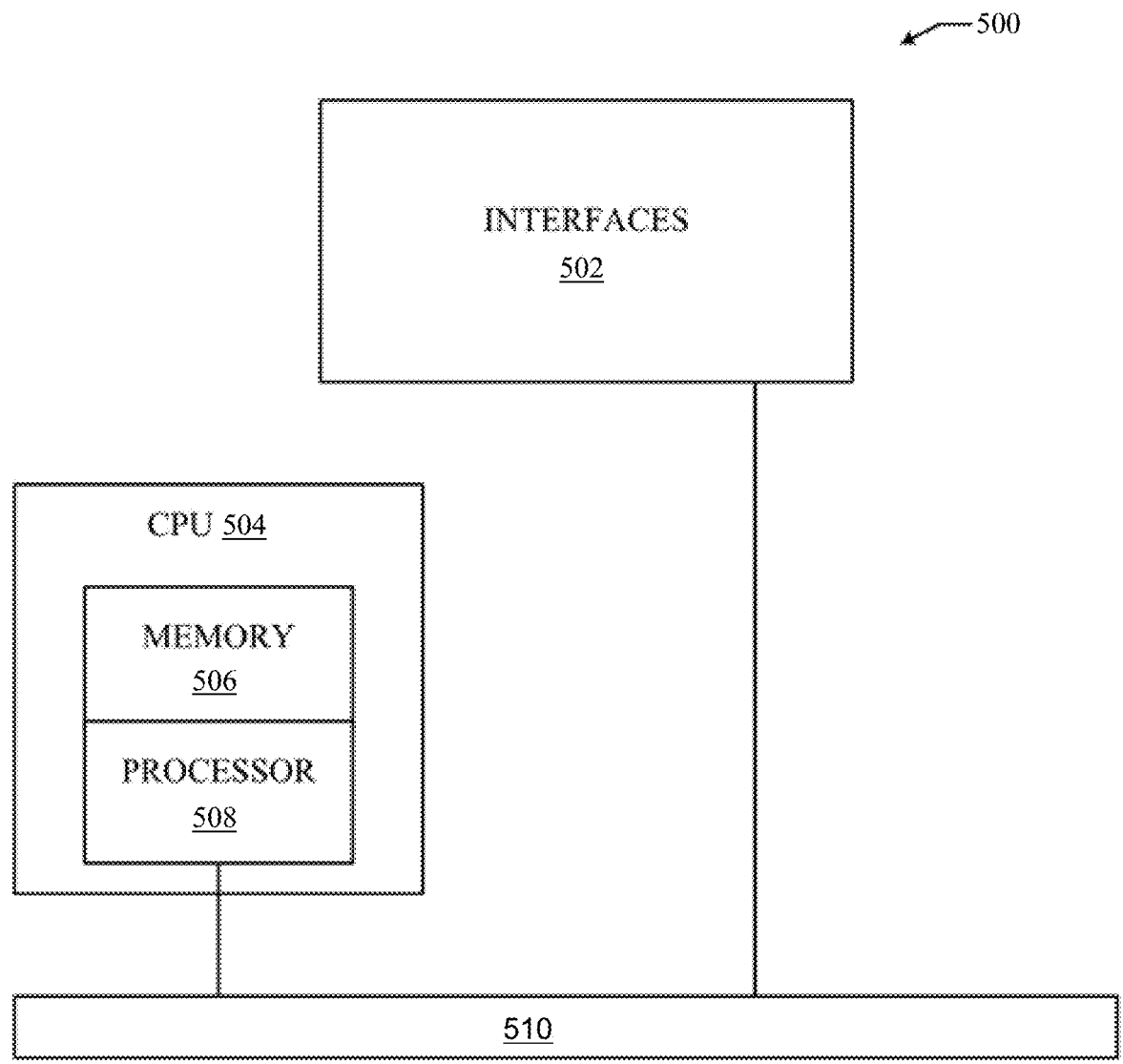
FIG. 5 illustrates an example architecture of a computing device, in accordance with some embodiments of the present technology.

The disclosure now turns to FIGS. 4 and 5, which illustrate example architectures of computing network devices, such as client computers, switches, routers, servers, and so forth.

FIG. 4 illustrates a computing system architecture 400 including components in electrical communication with each other using a connection 405, such as a bus. System 400 includes a processing unit (CPU or processor) 410 and a system connection 405 that couples various system components including the system memory 415, such as read-only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware or software service, such as service 1 432, service 2 434, and service 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read-only memory (ROM) 420, and hybrids thereof.

The storage device 430 can include services 432, 434, 436 for controlling the processor 410. Other hardware or software modules are contemplated. The storage device 430 can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

FIG. 5 illustrates an example network device 500 suitable for performing switching, routing, assurance, and other networking operations. Network device 500 includes a central processing unit (CPU) 504, interfaces 502, and a connection 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 504, such as a processor from the INTEL X106 family of microprocessors. In some cases, processor 508 can be specially designed hardware for controlling the operations of network device 500. In some cases, a memory 506 (e.g., non-volatile RAM, ROM, TCAM, etc.) also forms part of CPU 504. However, there are many different ways in which memory could be coupled to the system. In some cases, the network device 500 can include a memory and/or storage hardware, such as TCAM, separate from CPU 504. Such memory and/or storage hardware can be coupled with the network device 500 and its components via, for example, connection 510.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing, switching, and/or other operations. The ASIC can communicate with other components in the network device 500 via the connection 510, to exchange data and signals and coordinate various types of operations by the network device 500, such as routing, switching, and/or data storage operations, for example.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for user-guided deployment and management of a fabric, comprising:
creating a virtual stateful fabric representation of the fabric including a virtualized overlay of the fabric and a virtualized underlay of the fabric from a user-instantiated underlay fabric template defined by one or more default underlay policies for a specific type of software-defined network fabric, one or more user-specified overlay fabric policies, and a network topology information computed from one or more devices imported onto the fabric as a subset of a total number of devices in the fabric, wherein the user-instantiated underlay fabric template is selected from a plurality of underlay fabric templates having varying default underlay policies across a plurality of different types of software-defined network fabrics and the virtual stateful fabric representation is characterized, at least in part, by an expected fabric configuration of the fabric;
identifying a set of expected configurations corresponding to the virtual stateful fabric representation by converting a combination of the one or more default underlay policies and the one or more user-specified overlay fabric policies into one or more pending configuration lines; and
deploying, onto the one or more devices, the one or more pending configuration lines to bring a state of the one or more devices into synchronization with the set of expected configurations in the virtual stateful fabric representation.

2. The method of claim 1, wherein the one or more pending configuration lines are provided by performing a difference operation between the set of expected configurations and a running configuration on at least one of the one or more devices imported onto the fabric.

3. The method of claim 1, wherein the network topology information is determined from a connectivity state of the one or more devices using a network discovery protocol.

4. The method of claim 3, wherein the network discovery protocol corresponds to one of a Cisco Discovery Protocol or a Link Layer Discovery protocol.

5. The method of claim 1, wherein the user-instantiated underlay fabric template corresponds to an underlay fabric template selected from a menu of pre-configured fabric templates and one or more user-provided values for instantiating one or more parameters of the underlay fabric template.

6. The method of claim 5, wherein the underlay fabric template is customizable by a user using a policy editor.

7. The method of claim 5, wherein the one or more parameters of the underlay fabric template comprises at least one of an IP address range, an Autonomous System Number, an Underlay routing protocol, a VLAN identifier range or one or more virtual Port Channel identifiers.

8. The method of claim 1, wherein the one or more user-specified overlay fabric policies comprises one or more user-specified roles assigned to at least one of the one or more devices imported onto the fabric.

9. The method of claim 1, wherein one or more discrepancies between the virtual stateful fabric representation and the state of the one or more devices is detected using one or more Data Management Engine (DME) notifications for configuration changes and a difference operation between the set of expected configurations and a running configuration on at least one of the one or more devices imported onto the fabric.

10. The method of claim 9, wherein the one or more discrepancies are resolved by providing one or more configuration lines to be deployed onto or removed from the one or more devices to thereby bring the state of the one or more devices into agreement with the set of expected configurations.

11. The method of claim 1, wherein the one or more devices are imported onto the fabric using either or both discovery credentials based on a username and a password and a discovery Graphical User Interface (GUI) featuring a user-activated bootstrap function.

12. The method of claim 11, wherein the discovery GUI further comprises a user-activated Power On Auto Provisioning (POAP) function.

13. A system comprising:
one or more processors; and
at least one computer-readable storage medium having stored therein instructions which, when executed by the one or more processors, cause the one or more processors to:
create a virtual stateful fabric representation of the fabric including a virtualized overlay of the fabric and a virtualized underlay of the fabric from a user-instantiated underlay fabric template defined by one or more default underlay policies for a specific type of software-defined network fabric, one or more user-specified overlay fabric policies and a network topology information computed from one or more devices imported onto a fabric as a subset of a total number of devices in the fabric, wherein the user-instantiated underlay fabric template is selected from a plurality of underlay fabric templates having varying default underlay policies across a plurality of different types of software-defined network fabrics and the virtual stateful fabric representation is characterized, at least in part, by an expected fabric configuration of the fabric;
identify a set of expected configurations corresponding to the virtual stateful fabric representation by converting a combination of the one or more default underlay policies and the one or more user-specified overlay fabric policies into one or more pending configuration lines; and
deploy, onto the one or more devices, the one or more pending configuration lines to bring a state of the one or more devices into synchronization with the set of expected configurations in the virtual stateful fabric representation.

14. The system of claim 13, wherein the one or more pending configuration lines are provided by performing a difference operation between the set of expected configurations and a running configuration on at least one of the one or more devices imported onto the fabric.

15. The system of claim 13, wherein the user-instantiated underlay fabric template corresponds to an underlay fabric template selected from a menu of pre-configured fabric templates and one or more user-provided values for instantiating one or more parameters of the underlay fabric template.

16. The system of claim 15, wherein the underlay fabric template is customizable by a user using a policy editor.

17. The system of claim 15, wherein the one or more parameters of the underlay fabric template comprises at least one of an IP address range, an Autonomous System Number, an Underlay routing protocol, a VLAN identifier range or one or more virtual Port Channel identifiers.

18. The system of claim 13, wherein the one or more user-specified overlay fabric policies comprises one or more user-specified roles assigned to at least one of the one or more devices imported onto the fabric.

19. The system of claim 13, wherein one or more discrepancies between the virtual stateful fabric representation and the state of the one or more devices is detected using one or more Data Management Engine (DME) notifications for configuration changes and a difference operation between the set of expected configurations and a running configuration on at least one of the one or more devices imported onto the fabric.

20. The system of claim 19, wherein the one or more discrepancies are resolved by providing one or more configuration lines to be deployed onto or removed from the one or more devices to thereby bring the state of the one or more devices into agreement with the set of expected configurations.

* * * * *